United States Patent
Sun et al.

(10) Patent No.: US 6,272,250 B1
(45) Date of Patent: Aug. 7, 2001

(54) COLOR CLUSTERING FOR SCENE CHANGE DETECTION AND OBJECT TRACKING IN VIDEO SEQUENCES

(75) Inventors: Shijun Sun; Yongmin Kim, both of Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/233,894

(22) Filed: Jan. 20, 1999

(51) Int. Cl.[7] .............................. G06K 9/00; G06K 9/62

(52) U.S. Cl. ................. 382/225; 382/155; 382/159; 382/162; 382/165; 382/224

(58) Field of Search ................................. 382/156, 157, 382/158, 181, 186, 187, 224, 225, 162, 165, 159

(56) References Cited

U.S. PATENT DOCUMENTS

| | | | |
|---|---|---|---|
| 5,058,180 | * 10/1991 | Khan | 382/158 |
| 5,133,021 | 7/1992 | Carpenter et al. | 382/156 |
| 5,142,590 | 8/1992 | Carpenter et al. | 382/157 |
| 5,157,738 | 10/1992 | Carpenter et al. | 382/157 |
| 5,384,895 | * 1/1995 | Rogers et al. | 706/20 |
| 5,644,652 | * 7/1997 | Bellegarda et al. | 382/186 |
| 5,835,901 | * 11/1998 | Duvoisin, III et al. | 706/19 |
| 5,872,865 | * 2/1999 | Normile et al. | 382/224 |
| 5,912,989 | * 6/1999 | Watanabe | 382/228 |
| 6,052,481 | * 4/2000 | Grajski et al. | 382/187 |
| 6,064,770 | * 5/2000 | Scarth et al. | 382/225 |

OTHER PUBLICATIONS

Carpenter et al., "ART 2: Self–Organization of Stable Category Recognition Codes for Analog Input Patterns," Applied optics vol. 26, No. 23, Dec. 1, 1987.

Carpenter et al., "A Massively Parallel Architecture for a Self–Organizing Neural Pattern Recognition Machine," Computer Vision, Graphics and Image Processing, vol. 37 pp. 54, 55, 115 (1987).

Grossberg, S., "Adaptive Pattern Classification and Universal Recoding: I. Parallel Development and Coding of Neural Feature Detectors," Biological Cybernetics vol. 23, pp. 121–134 (1976).

Celenk et al., "Color Image Coding Using Block Truncation and Vector Quantization," SPIE vol. 2952, pp. 347–354, 1996.

Orchard et al. "Color Quantization of Images," IEEE Transactions on Signal Processing, vol. 39, No. 12, Dec. 1991.

Gray, Robert M., "Vector Quantization," IEEE ASSP Magazine Apr. 1984.

Baraldi, et al. "a nueral network for unsupervised catagorization of mulivalued input patterns: an applicaion to satellite image clustering", IEEE, pp. 305–316, 1995.*

(List continued on next page.)

Primary Examiner—Leo Boudreau
Assistant Examiner—Daniel G. Mariam
(74) Attorney, Agent, or Firm—Steven P. Koda (57) ABSTRACT

Pixel data forming an image is clustered into groups of data of similar color. Pixels of approximately the same color form one cluster. A vigilance parameter determines how many clusters are derived and how wide a range of colors are included in a cluster. The process for allocating input vectors into clusters is based upon a minimum distance measure to multiple prototype vectors. A given image frame is allocated into clusters in an iterative process. A subset of clusters from an initial image frame are treated as featured clusters. The featured clusters correspond object(s). To track the object, input vectors in subsequent frames are tested to determine whether they correspond to a featured cluster. A scene change is detected when more than a prescribed number of prototype vectors have changed by more than a predetermined amount.

24 Claims, 2 Drawing Sheets

OTHER PUBLICATIONS

Kusswurm, D C; "A Color Quantizer for Video Sequences," Very High Resolution and Quality Imaging III, San Jose, Ca Jan. 30, 1998, Proc. of SPIE, pp. 105–113.

Gonzalez, A I et al.; "Competitive Neural Networks as Adaptive Algorithms for Nonstationary Clustering: exp results on the color quantization of image sequences" 1997 IEEE Intl. Conf on Neural Networks, pp. 1602–1607.

Soo–Chang Pei et al. "Color Image Compression andLimited Display Using Self–Organization Kohonen MAp," IEEE Trans on Circuits and Systems for Video Tech, Apr. 1998, vol. No. 2, pp. 191–205.

Bischof, N. et al.; "MDL–based design of vector quantizers" Proc 14th Intl. Conf on Pattern Recognition Australia, 16–20 Aug. 1998, pp. 891–893.

* cited by examiner

FIG.3

COLOR CLUSTERING FOR SCENE CHANGE DETECTION AND OBJECT TRACKING IN VIDEO SEQUENCES

BACKGROUND OF THE INVENTION

This invention relates to a method and apparatus for clustering color data in video sequences, and more particularly to color clustering methods for detecting video sequence scene changes and color clustering methods for tracking objects in a video sequence.

Conventional methods for clustering color data of an image are based on block truncation and vector quantization. Block truncation of image data is a coding process in which significant visual features are retained while other data is discarded. Vector quantization is a process for mapping a sequence of vectors into a digital sequence suitable for communication over a digital channel and for storage on a digital media. In a typical block truncation implementation an image is divided iteratively to achieve an optimal number of component subimages. Classification criterion is used to truncate the data within a window. Each color class within a window is represented by a corresponding mean color vector. A linear vector quantizer determines a mapping of the subimage pixels.

Another method for clustering data is found in pattern learning and recognition systems based upon adaptive resonance theory (ART). Adaptive resonance theory, as coined by Grossberg, is a system for self-organizing stable pattern recognition codes in real-time data in response to arbitrary sequences of input patterns. (See "Adaptive Pattern Classification and Universal Recoding: II . . . ," by Stephen Grossberg, Biological Cybernetics 23, pp. 187–202 (1976)). It is based on the problem of discovering, learning and recognizing invariant properties of a data set, and is somewhat analogous to the human processes of perception and cognition. The invariant properties, called recognition codes, emerge in human perception through an individual's interaction with the environment. When these recognition codes emerge spontaneously, as in human perception, the process is said to be self-organizing.

It is desirable that neural networks implementing adaptive resonance theory be capable of self-organizing, self-stabilizing and self-scaling the recognition codes in response to temporal sequences of arbitrary, many-input patterns of varying complexity. A system implementing adaptive resonance theory generates recognition codes in response to a series of environmental inputs. As learning proceeds, interactions between the inputs and the system generate new steady states and basins of attraction. These steady states are formed as the system discovers and learns critical feature patterns that represent invariants of the set of all experienced input patterns. This ability is referred to as plasticity. The learned codes are dynamically buffered against relentless recoding due to irrelevant inputs. The buffering process suppresses possible sources of instability.

Adaptive Resonance Theory-1 ('ART 1') networks implement a set of differential equations responsive to arbitrary sequences of binary input patterns. Adaptive Resonance Theory-2 ('ART 2') networks self-organize stable recognition categories in response to arbitrary sequences of not only binary, but also analog (gray-scale, continuous-valued) input patterns. See "ART 2: Self-Organization of Stable Category Recognition Codes for Analog Input Patterns," by Gail A. Carpenter and Stephen Grossberg. To handle arbitrary sequences of analog input patterns, ART 2 architectures employ a stability-plasticity tradeoff, a search-direct access tradeoff and a match-reset tradeoff. Top down learning expectation and matching mechanisms are significant features in self-stabilizing the code learning process. A parallel search scheme updates itself adaptively as the learning process unfolds. After learning stabilizes, the search process is disengaged. Thereafter input patterns directly access their recognition codes without any search. A novel input pattern can directly access a category if it shares invariant properties with a set of exemplars of that category. A parameter called an attentive vigilance parameter determines how fine the categories are to be. If vigilance decreases due to environmental feedback, then the system automatically searches for and learns finer recognition categories. If vigilance increases due to environmental feedback, then the system automatically searches for and learns coarser recognition categories.

An ART-2 network is modified to achieve an inventive clustering and pattern recognition system of this invention.

SUMMARY OF THE INVENTION

According to the invention, a set of pixel data forming an input image is clustered into groups of data of similar color. All pixels of approximately the same color are grouped into one cluster. A vigilance parameter determines how many clusters are derived and how wide a range of colors are included in a cluster.

In a sequence of image frames a given frame corresponds to a data set. One member of the set is a data point. A data point, for example, corresponds to a pixel and is coded using RGB, YUV or another known or standard color coding scheme. Each data point is an input vector. The input vectors are grouped into clusters. A given cluster has a corresponding centroid value, referred to herein as a prototype vector. The prototype vector corresponds to a weighted centroid (color) for such cluster.

The process for allocating input vectors into clusters is based upon a minimum distance measure. An input vector is allocated to the cluster having a prototype vector to which the input vector is closest (i.e., minimal distance from the cluster's prototype vector). As a self-organizing control for allocating data into clusters, a vigilance parameter, also referred to herein as a vigilance value, is used. If the minimum euclidean distance is not less than the vigilance value, then a new cluster is defined. The input vector is the initial prototype vector for such new cluster. Thus, an input vector is allocated to a pre-existing cluster or a new cluster.

A given image frame is allocated into clusters in an iterative process. According to one aspect of this invention, after any given iteration the number of input vectors in each resulting cluster is tested. If there are less than a threshold number of input vectors in a cluster, then such cluster is discarded. More specifically, the prototype vector for such cluster is discarded. During a subsequent iteration for allocating input vectors of the same image frame, the remaining prototype vectors from the prior iteration are the initial prototype vectors. The input vectors are compared to each of these remaining prototype vectors to find the one prototype vector to which is closest (e.g., minimum euclidean distance between input vector and prototype vector; this corresponds physically to the closest color). It is expected that the input vectors in the discarded cluster from the preceding iteration will be allocated among the old or into one or more new clusters in the next iteration.

According to another aspect of this invention, self-stabilizing of the clustering process is achieved by testing if the number of input vectors in each cluster after an iteration has changed by an insignificant amount. If only an insignificant change has occurred, then the iterative process is complete, because clustering has stabilized for such image frame. Otherwise another iteration, up to a prescribed maximum number of iterations, is performed.

According to another aspect of the invention, the final prototype vectors for a given image frame are used as the initial prototype vectors for the next image frame in a sequence of image frames.

According to another aspect of the invention, a first vigilance value is used for allocating input vectors of an initial image frame, while a higher vigilance value is used for allocating input vectors of subsequent image frames in a related sequence of image frames.

According to another aspect of this invention, a select subset of clusters from an initial image frame are treated as featured clusters. The featured clusters correspond to one or more objects within the initial image frame. Input vectors in subsequent frames then are tested to determine whether they correspond to a featured cluster. Presence of a given featured cluster in each one of a sequence of image frames corresponds to tracking of such featured cluster (and the corresponding object) among the sequence of image frames.

According to another aspect of the invention, upon processing any given image frame in a sequence of image frames, if more than a prescribed number of prototype vectors has changed by more than a predetermined amount, then a scene change is considered to have occurred. Specifically, the rate of cluster change is tracked from image frame to image frame. If the rate exceeds a prescribed value, then a scene change has occurred.

According to another aspect of this invention, if a scene change is observed, then the image frame at which such scene change occurs becomes an initial frame. Such image frame then is processed as an initial frame. The prototype vectors resulting for such initial frame then are the starting prototype vectors for the subsequent frame.

According to an advantage of this invention, a fast reliable method for tracking an object in a video sequence is achieved. According to another advantage of the invention, a fast reliable method for detecting scene changes in a video sequence is achieved. These and other aspects and advantages of the invention will be better understood by reference to the following detailed description taken in conjunction with the accompanying drawings.

DESCRIPTION OF SPECIFIC EMBODIMENTS

Overview

Figures 1, 2:
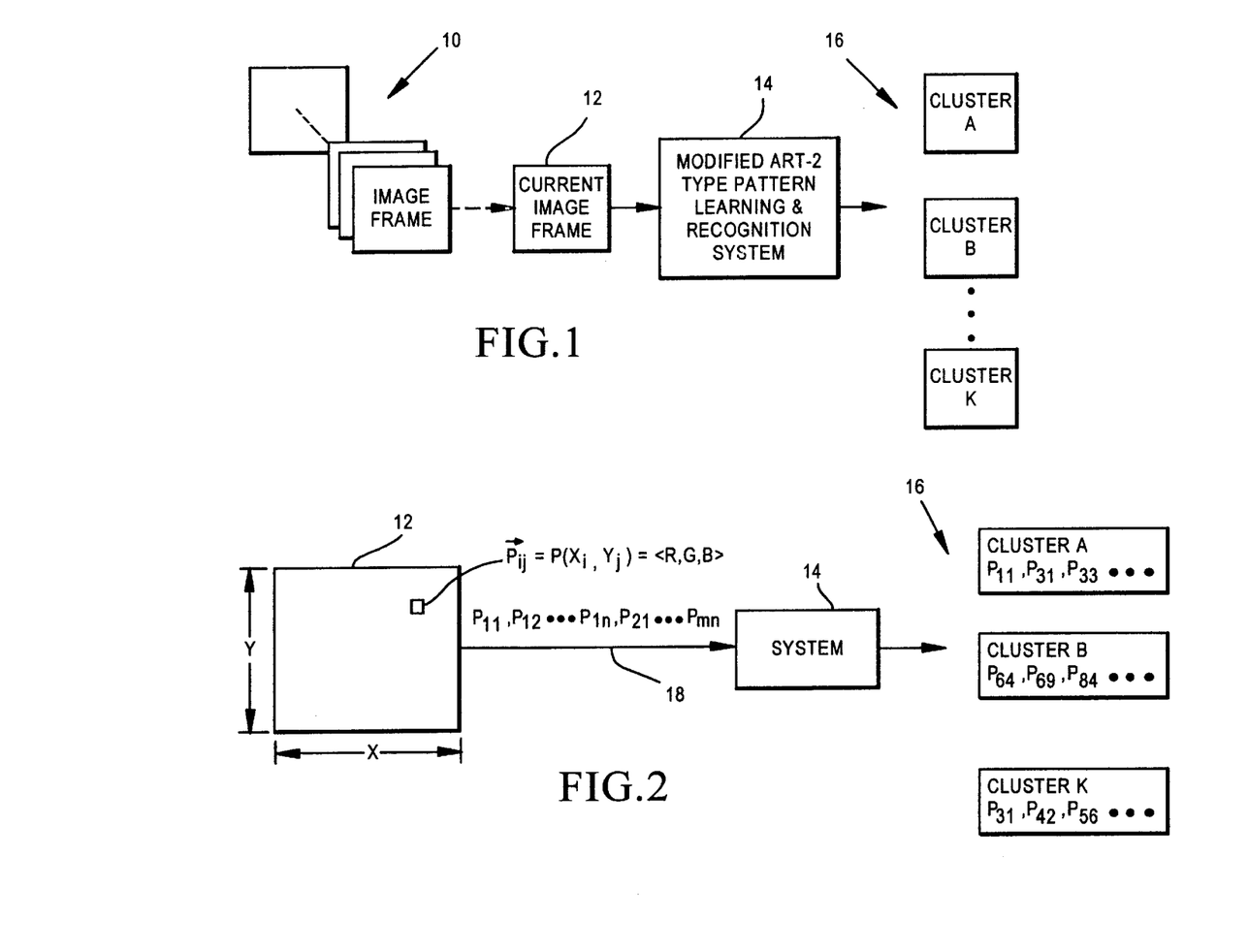
FIG. 1 is a diagram of a pattern learning and recognition system according to an embodiment of this invention.
FIG. 2 is a diagram of an input, processing, output sequence for a current image frame to be processed.

A modified adaptive resonance theory-2 ("modified ART-2") system is implemented to perform pattern learning and recognition from a sequence of input image frames. Referring to FIG. 1, a sequence 10 of image frames 12 are input to the modified ART-2 system 14. The system 14 processes a current image frame 12 grouping the image frame contents into clusters 16. Processing is performed for all or select image frames 12. Referring to FIG. 2 an image frame 12 is formed by an array of image pixels P. For a raster type image frame, the image pixels are arranged into y rows and x columns. In a preferred embodiment the image pixels are color image pixels coded according to a standard red, green, blue coding scheme (e.g., NTSC), a standard yellow, magenta, cyan and black coding scheme (YMCK), a standard luminosity, chrominance, brightness coding scheme (e.g., YUV) or some other color coding scheme. Each image frame is a set of data points. Each pixel is a data point. A data point is referred to herein as an input vector. Input vector $P_{ij}$ corresponds to pixel P $(x_i, Y_j)$ which for an RGB coding scheme has a value (R,G,B). The system 14 processes a sequence 18 of input vectors P corresponding to a given set of data points (i.e., a current image frame 12). The input vectors P are grouped into clusters 16.

Each cluster 16 is a learned or a recognized pattern. For a first set of input data (i.e., an initial image frame) there is no prior information for allocating the data points into clusters. Thus, the patterns are learned. For subsequent sets of data points (e.g., subsequent images in a sequence of image frames), the patterns previously learned may be used. Specifically, data points for a current set of data points (image frame) are tested to try and recognize the prior patterns in the new set of data points. The process for analyzing the subsequent sets of data points is a recognition process. During the recognition process, the previous learned patterns also are updated and modified based upon the new data.

Pattern Learning and Recognition

Figure 3:
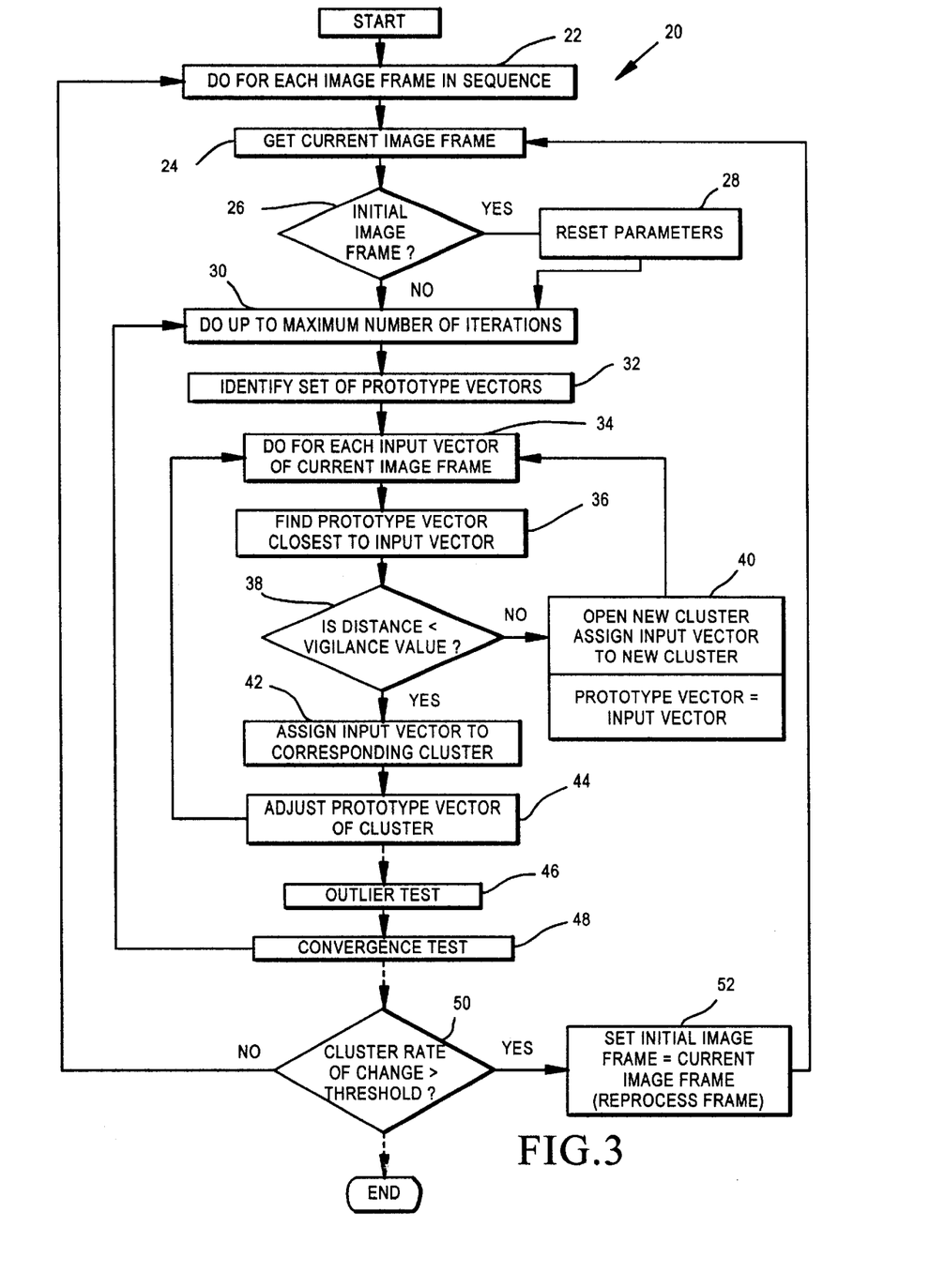
FIG. 3 is a flow chart for a method of pattern learning and recognition according to an embodiment of this invention.

Referring to FIG. 3, the process (20) for pattern learning and recognizing commences at step 22—"Do for each image frame in sequence (10)" of image frames 12. According to various embodiments, every image frame in the sequence 10 or select image frames in the sequence are processed. In the preferred embodiment all frames are processed in sequence. In an alternative embodiment every n-th frame is processed. At step 24, the input vectors for the current image frame are obtained. If the current image frame is an initial image frame (step 26), then at step 28 various parameters are reset. Further, if the current image frame is an initial image frame then there are no clusters that have been started.

The current image frame 12 is processed in an iterative manner (step 30). At step 32, an initial set of prototype vectors for this processing iteration of the current image frame is obtained. There is a prototype vector for each cluster defined. If the current image frame is an initial image frame, then there are no prototype vectors. The prototype vector is a weighted centroid value based upon a history of input vectors allocated to the corresponding cluster.

The process for allocating input vectors into clusters is performed for each input vector (step 34). Such process is based upon a minimum distance measure. In various embodiments an euclidean distance, an absolute distance or some other distance measure is used. In one embodiment the euclidean distance is used. An input vector is allocated to a cluster to which it has a minimal euclidean distance with the cluster's prototype vector. At step 36, the prototype vector closest to the input vector is found. As a self-organizing control for allocating data into clusters, a vigilance parameter, also referred to herein as a vigilance value, is used. A vigilance test is performed at step 38. If the minimum euclidean distance is not less than the vigilance value, then a new cluster is defined at step 40. The input vector is assigned to such new cluster and becomes the initial prototype vector for such new cluster. If the minimum euclidean distance is less than the vigilance value, then the input vector is assigned to the cluster corresponding to the closest prototype vector at step 42. Thus, an input vector is allocated to a pre-existing cluster or a new cluster.

For a new learning and recognition process, there are no prototype vectors to start with. Thus, the first input vector will define an initial prototype vector for a first cluster. The minimum distance between the next input vector and the prototype vectors will be to the first prototype vector (since at this point in the example there is only one prototype vector). If such minimum distance exceeds the vigilance value, then the second input vector becomes an initial prototype vector for a second cluster. If, however, such minimum distance is within the vigilance value distance, then the second input vector is allocated to the first cluster.

If the second input vector is allocated to the first cluster, then the prototype vector for such first cluster is modified at step 44. The modified prototype vector for the first cluster becomes the weighted centroid value for all data points among the first cluster, based upon the following equation:

$$w_k^{(new)} = \frac{P(x, y) + w_k^{(old)} \|\text{cluster}_k^{(old)}\|}{\|\text{cluster}_k^{(old)}\| + 1}$$

where, $W_k^{(new)}$=new prototype vector for cluster k=new centroid value;

$W_k^{(old)}$=old prototype vector for cluster k=old centroid value;

P(x,y)=input vector;

$\|\text{cluster}_k^{(old)}\|$=number of vectors in cluster k.

The influence of the new input vector in the cluster has a weighted influence on the prototype vector of the cluster. The weight is proportional to the number of input vectors in the cluster, and thus, corresponds to a statistical centroid. This process for updating the prototype vector provides a self-scaling feature to the cluster learning and recognition process.

This process is used for allocating each input vector of the current image frame. Once all the input vectors have been allocated in a given iteration, testing is performed to determine whether another iteration is needed and whether outlier clusters are present.

For an initial data set where no information is previously stored, one or more initial clusters are defined as above. An iterative process is used, however, to achieve a self-stabilizing quality to the clusters. Specifically, once the entire data set has been processed, allocating the input vectors into clusters, another iteration of allocating the input vectors into clusters is performed. Prior to performing another iteration, however, the clusters are analyzed for quantity in an outlier test (see step 46). According to such test, any cluster having less than a prescribed threshold number of input vector members is discarded. More specifically the prototype vector is discarded and thus not used in finding a minimum distance to input vectors during a subsequent iteration. The input vectors in the discarded cluster are considered to be outliers (e.g., noise).

Consider, for example, a data set including 30,000 data values. Also, consider that after the first iteration, a first cluster has 20,000 members, a second cluster has 8,000 members, a third cluster has 1985 members, and a fourth cluster has 15 members. In this example, assume the prescribed threshold value is 64. Because cluster 4 has less than 64 input vector members, it is discarded. It is expected that many of the input vectors in this fourth cluster will be allocated into another cluster during a subsequent reiteration. Note that this is an example, and that the threshold value may be prescribed as a matter of design, or based upon empirical analysis.

For the next iteration the prototype vectors from the remaining clusters of the prior iteration are retained (step 32 of next iteration). In our example above, the prototype vectors from the first three clusters are retained, while the prototype vector from the fourth cluster is discarded. Each input vector then is re-allocated to a cluster during this subsequent iteration by determining the prototype vector to which it has a minimum euclidean distance. If such minimum distance is less than the vigilance value, then the input vector is allocated to the cluster corresponding to that prototype vector. If such minimum distance exceeds the vigilance value, then the input vector defines a prototype vector for a new cluster. According to various embodiments, either the same or a different vigilance value is used during the subsequent iterations.

Upon identifying a cluster into which an input vector is allocated during a subsequent iteration, the prototype vector (i.e., weighted centroid) for such cluster is recalculated. During the subsequent iteration the number of input vectors in the cluster is not reset, but remains at its last count from the prior iteration. Thus, the weighting influence of the current input vector is less during the subsequent iteration than during the prior iteration.

After the subsequent iteration is complete, like in the prior iteration, any cluster having fewer than a prescribed threshold number of input vector members is discarded (step 46). The clusters then are tested for convergence (step 48) to see if the number of input vector members in each cluster has significantly changed. If the number has not changed significantly, then the iterative process is complete. In this sense, the process is self-stabilizing. If a cluster was discarded for such iteration, such discarded cluster is considered to be an outlier and the members are considered as noise.

The number of cluster members is considered to change significantly if it has changed by more than a prescribed number of data points or prescribed percentage, whichever is larger. Such number and percentage are defined empirically. If the number of members has changed significantly then a new iteration is performed (step 30). In the new iteration, the remaining (e.g., non-discarded) prototype vectors from the immediately prior iteration are used as the initial prototype vectors for each remaining cluster (step 32). The iterations continue until, either the number of members in each cluster is not changed significantly (convergence test at step 48), or a prescribed maximum number of iterations has occurred. Such maximum number of iterations is determined as a matter of design or empirically.

For a sequence of image frames, in addition to learning patterns found in the data, prototype patterns also can be recognized when present in a current data set among the sequence. For example, a set of prototype patterns (e.g., clusters) is found from a first data set in a sequence, (e.g., a first image frame in a sequence of image frames) using the learning processes described above. The prototype patterns correspond to the final clusters after the learning process self-stabilizes (or repeats for the maximum number of iterations). A next image frame in the sequence 10 then is processed (step 22) using the method as described above. For such next image frame, rather than start with no prototype vectors, the final prototype vectors from the prior image frame are used.

Specifically, each input vector in such next image frame is allocated to a cluster by determining the prototype vector to which it has a minimum euclidean distance (step 36). If such minimum distance is less than the vigilance value (step 38), then the input vector is allocated to the cluster corresponding to that prototype vector (step 42). If such minimum distance exceeds the vigilance value, then the input vector defines a prototype vector for a new cluster (step 40). A new cluster corresponds to a new prototype pattern. According to various embodiments, either the same or a different vigilance value is used for the subsequent image frames in the sequence relative to that used for an initial image frame. In a preferred embodiment, the vigilance value is increased for the subsequent data sets, relative to that for the initial data set.

Upon identifying a cluster into which an input vector is allocated, the prototype vector (i.e., centroid) for such cluster is recalculated. The number of input vectors in the cluster is held over from the processing of the prior image frame. Thus, the prototype vector is a weighted centroid based upon multiple iterations of multiple image frames in a sequence of image frames.

After all the input vectors of the current data set have been allocated into clusters, another iteration of allocating the input vectors into clusters is performed. Prior to performing another iteration, however, the clusters are analyzed for quantity in the outlier test (step 46). Any cluster having less than a prescribed threshold number of input vector members is discarded as described above for the initial data set. For the subsequent iteration the prototype vectors from the remaining clusters of the first iteration are retained. Each input vector then is re-allocated to a cluster during the subsequent iterations in the same manner as described above.

Each image frame in the sequence is similarly processed. In a preferred embodiment, the starting prototype vectors for allocating input vectors of a current data set are the final prototype vectors obtained during processing of the immediately prior data set. Further the count of the number of input vectors in a clusters is held over from prior iterations and prior image frames. New clusters defined as the sequence of data clusters continue correspond to new prototype patterns. New prototype patterns may occur in an image sequence, for example, due to an image object insertion, deletion or change.

Detecting Scene Changes Within a Sequence of Image Frames

In the course of processing a sequence of image frames of a common scene, it is expected that much of the image content is similar from image frame to image frame. As a result, the defined clusters will be similar from image frame to image frame. The hold over of the count of input vectors in a cluster used in weighting the centroid of the cluster is based upon such assumption. If while processing a given image frame however, it is determined that the prototype vectors for each one of several clusters have changed beyond a threshold amount, then it is considered that the scene being imaged has changed. Specifically, upon processing any given image frame, if more than a prescribed number of prototype vectors has changed by more than a predetermined amount, then a scene change is considered to have occurred.

A scene change is determined by tracking a cluster change ratio from image frame to image frame. Specifically, after the iterative processing of input vectors for a current image frame is complete, the cluster rate of change for that image frame is derived at step 50. Cluster rate of change is derived in a preferred embodiment using the following equation:

$$R^f = \frac{\sum_{k=1}^{n_c^f} |N_k^f - N_k^{f-1}|}{N_{total}}$$

where,
$R^f$=cluster change ratio for image frame f;
$N_k^f$=number of input vectors in cluster k of frame f (actual number, not the count used in prototype vector centroid which counts input vector for each iteration);
$N_{total}$=total number of input vectors in image frame f; and
$n_c^f$=number of clusters in frame f.

Note that if the k-th cluster in frame f is a new cluster, then $N_k^{f-1}$ is simply zero. A scene change is identified when the cluster change ratio for an image frame f exceeds a prescribed value, (e.g., 5%–10%). The prescribed value is determined empirically or be design and may exceed the example values of 5%–10%.

If a scene change is detected at step 50 for a current image frame f, then at step 52 image frame f is set to be an initial frame. Image frame f then is re-processed as the current frame in step 24. Since it is an initial frame, parameters are reset at step 28. Specifically, the prototype vectors are discarded. Thus at step 32 there are no prototype vectors. As a result, during processing of the first input vector, such input vector will define a new cluster and become the prototype vector for such cluster (step 40). Additional cluster then are defined based upon whether the current input vector is farther than the vigilance value distance away from the prototype vector(s). Note that initially there are no prior input vectors in each new cluster (cluster count=0 when first deriving the weighted centroid of a new cluster).

Object Tracking Within a Sequence of Video Frames

An object can be tracked using the learning and recognition process described above. To do so, one or more prototype vectors are noted for a given image frame. Specifically, the given image frame is processed as described above for an initial image frame. One or more of the resulting clusters serve as reliable indicators of the object presence within the image frame. Such reliable indicator cluster(s) is referred to herein as a featured cluster(s). In some embodiment, the given image frame need not be processed as an initial data set. Instead it may be a subsequent data set in which one or more new clusters are defined which correspond to the introduction of the object into the image sequence.

Once the feature cluster(s) are identified, and more specifically the prototype vector for such feature cluster(s), the recognition of such cluster in subsequent image frames is noted. Using the recognition process described above, the input vectors of a subsequent frame are allocated into clusters. If there are any of the final clusters for the subsequent image frame which correspond to a featured cluster, then the object is considered to be present in such image frame. For reliable object tracking, it is preferable that there be several clusters found in each image frame. To increase the number of clusters defined by the learning and recognition processes, the vigilance value is decreased.

According to another method of object tracking, upon processing input vectors of an image frame to derive clusters, clusters are identified which include pixels of a desired object to be tracked. Of such clusters, one or more clusters may serve as useful indicators of the object in the frame. In one embodiment a cluster is evaluated to be a useful indicator based upon the size of a "connected region". For example, if the input vector of a center pixel is identical to that of each of its 8 neighboring pixels, that input vector is considered to be 8-connected. If some of those neighboring pixels also are 8-connected, all the 8-connected pixels (and the neighboring pixels) form a connected region. A cluster may have 0 or more areas of connected regions.

A connected region or regions in one cluster is used to indicate the presence of an object. Similarly, such connected region(s) in such one cluster together with connected region (s) in other clusters may also serve as an indicator of the object. Thus, the object is indicated by one or more connected regions among one or more clusters. The object need not encompass the entire cluster or clusters having the connection region(s) being used.

Relational information among the indicating connected regions is determined in each image frame in which the object is desired to be tracked. The relational information includes the geometry and relative distance between connected regions or other information which relates one connected region to another. If the relational information has not changed significantly from one image frame to the next image frame, then the object is considered to be present in such one image frame and the next image frame. If the relational information has changed significantly from one image frame to the next image frame, then the object present in the one image frame is considered not to be present in the next image frame. Note that an object may be found present in a next image frame even when it has moved relatively within a frame (e.g., rotated, translated in plane of the image). In various implementations, tracking complexity can be added to handle 3-dimensional objects which move or rotate in or out of the plane of the image. For 2-dimensional objects, the relational information is expected to be generally similar from frame to frame, relative to that of a rotating 3-dimensional object. What constitutes a significant change is determined based upon design or by empirical analysis.

Exemplary Host Computer System

The functions of the present invention preferably are performed by programmed digital computers of the type which are well known in the art. The host computer system typically includes a display monitor, a keyboard, a pointing/clicking device, one or more processors or multiprocessors, random access memory (RAM), a non-volatile storage device such as a hard disk drive, and other devices such as a communication or network interface (e.g., modem; ethernet adapter), a transportable storage media drive, such as a floppy disk drive, CD-ROM drive, zip drive, bernoulli drive or other magnetic, optical or other storage media. The various components interface and exchange data and commands through one or more busses. The computer system receives information by entry through the keyboard, pointing/clicking device, a network interface or another input device or input port. The computer system may be any of the types well known in the art, such as a mainframe computer, minicomputer, or microcomputer.

The operator may view the sequence 10 of image frames views 12 on the display. Further, each image frame and each cluster may be viewed as a still frame. Such ability to display a cluster or clusters is useful for identifying feature clusters to use in object tracking. In one embodiment a cluster is displayed in binary format (e.g., pixel 'on' if present in cluster; pixel 'off' if not present in cluster). In one embodiment for viewing a given cluster, each pixel in the cluster is displayed using the centroid value as the color for the pixel. In some embodiments, one or more, even all, of the clusters for a given image frame may be overlaid.

Meritorious and Advantageous Effects

According to an advantage of this invention, a fast reliable method for tracking an object in a video sequence is achieved. According to another advantage of the invention, a fast reliable method for detecting scene changes in a video sequence is achieved.

Although a preferred embodiment of the invention has been illustrated and described, various alternatives, modifications and equivalents may be used. For example, although a first image frame in a sequence is determined to be an initial frame and a frame for which a scene change is identified also is determined to be an initial frame, an operator also may reset the system at any time to identify a current image frame as an initial image frame. This is useful for example in object tracking where an operator selects a current image frame to start tracking an object.

Therefore, the foregoing description should not be taken as limiting the scope of the inventions which are defined by the appended claims.

What is claimed is:

1. A method for clustering input vectors of a current set of input vectors in a sequence of sets of input vectors, in which the current set of input vectors corresponds to a current image frame being processed and the sequence of sets of input vectors corresponds to a sequence of image frames, the method comprising the steps of:

identifying a set of prototype vectors for use in allocating the input vectors of the current set of input vectors into a plurality of clusters, wherein there is a one to one correspondence between the set of prototype vectors and the plurality of clusters;

allocating the input vectors of the current set of input vectors into a plurality of clusters of input vectors, wherein during the step of allocating, the set of prototype vectors changes dynamically resulting in a modified set of prototype vectors after all input vectors of the current set of input vectors are allocated among the plurality of clusters, each cluster among the plurality of clusters having a number of allocated input vectors; and after the step of allocating, discarding any prototype vector among the modified set of prototype vectors for which a corresponding cluster among the plurality of clusters has less than a specific number of allocated input vectors.

2. The method of claim 1, further comprising the step of:

iteratively repeating the steps of identifying, allocating and discarding for one of either of a maximum number of iterations or until the respective number of allocated input vectors for each cluster among the plurality of clusters stabilizes from a prior iteration to a current iteration, which ever occurs first.

3. The method of claim 1, further comprising the step of:

iteratively repeating the steps of identifying, allocating and discarding until the respective number of allocated input vectors for each cluster among the plurality of clusters stabilizes from a prior iteration to a current iteration.

4. The method of claim 3, in which during a first iteration for clustering input vectors of a first image frame among a sequence of image frames, there are no initial prototype vectors, and wherein for a first input vector of the first image frame, the first input vector is allocated to a new cluster, the prototype vector for the new cluster being set to the first input vector.

5. The method of claim 3, in which the modified set of prototype vectors after the step of discarding during one iteration is the set of prototype vectors identified in the identifying step of a subsequent iteration.

6. The method of claim 1, further comprising the step of:
iteratively repeating the steps of identifying, allocating and discarding for a prescribed number of iterations.

7. The method of claim 1, in which the step of allocating, comprises the step of changing the prototype vector for a given cluster of the plurality of clusters when an input vector is allocated to said given cluster by determining a statistical centroid of input vectors allocated to the given cluster.

8. The method of claim 1, in which the step of allocating, comprises the steps of:
deriving a vector distance magnitude between a current input vector of the current set of input vectors and each prototype vector of the set of prototype vectors;
identifying a minimum vector distance magnitude among the derived vector distance magnitudes;
identifying the prototype vector corresponding to the minimum vector distance magnitude;
when the minimum vector distance magnitude is less than a vigilance value, allocating the current input vector to a cluster corresponding to the identified prototype vector, and altering the identified prototype vector as a function of the current input vector;
when the minimum vector distance exceeds the vigilance value, allocating the current input vector to a new cluster, using the current input vector as a prototype vector for such new cluster, and including the prototype vector for said new cluster within the set of initial prototype vectors.

9. The method of claim 8, in which the method is repeated for subsequent image frames among the set of image frames, and further comprising the step of:
increasing the vigilance value after clustering input vectors of a first image frame among the sequence of image frames prior to clustering input vectors of a subsequent image frame among the sequence of image frames.

10. The method of claim 1, in which the method is repeated for subsequent image frames among the set of image frames, and further comprising the step of:
detecting a scene change among the sequence of image frames.

11. The method of claim 10, in which the step of detecting a scene change comprises the step of:
tracking a clustering change ratio for each image frame among the sequence of image frames.

12. The method of claim 1, in which the method is repeated for subsequent image frames among the set of image frames, and further comprising the step of:
identifying a feature cluster among the plurality of clusters achieved during allocating a current set of input vectors, wherein the feature cluster includes an indicator of presence of an object in the current image frame;
tracking the object through subsequent image frames among the sequence of image frames by monitoring said indicator while the method is repeated for subsequent image frames among the set of image frames.

13. The method of claim 12, in which a first value is used during the initial frame for the vigilance value, and in which the vigilance value is increased after clustering input vectors of the initial image frame during a common scene.

14. The method of claim 1, in which the method is repeated for subsequent image frames among the set of image frames, and further comprising the step of:
detecting a scene change among the sequence of image frames;
in response to a scene change detection, processing the current image frame as an initial image frame to reset the set of prototype vectors and reset the corresponding clusters.

15. A method for clustering input vectors of a current set of input vectors in a sequence of sets of input vectors, in which the current set of input vectors corresponds to a current image frame being processed and the sequence of sets of input vectors corresponds to a sequence of image frames, the method comprising the steps of:
identifying a set of prototype vectors for use in allocating the input vectors of the current set of input vectors into a plurality of clusters, wherein there is a one to one correspondence between the set of prototype vectors and the plurality of clusters;
allocating the input vectors of the current set of input vectors into a plurality of clusters of input vectors, wherein during the step of allocating, the set of prototype vectors changes dynamically resulting in a modified set of prototype vectors after all input vectors of the current set of input vectors are allocated among the plurality of clusters, each cluster among the plurality of clusters having a number of allocated input vectors;
after the step of allocating, discarding any prototype vector among the modified set of prototype vectors for which a corresponding cluster among the plurality of clusters has less than a specific number of allocated input vectors; and
iteratively repeating the steps of identifying, allocating and discarding until the respective number of allocated input vectors for each cluster among the plurality of clusters stabilizes from a prior iteration to a current iteration.

16. The method of claim 15, in which the step of allocating, comprises the step of changing the prototype vector for a given cluster of the plurality of clusters when an input vector is allocated to said given cluster by determining a statistical centroid of input vectors allocated to the given cluster.

17. The method of claim 15, in which the step of allocating, comprises the steps of:
deriving a vector distance magnitude between a current input vector of the current set of input vectors and each prototype vector of the set of prototype vectors;
identifying a minimum vector distance magnitude among the derived vector distance magnitudes;
identifying the prototype vector corresponding to the minimum vector distance magnitude;
when the minimum vector distance magnitude is less than a vigilance value, allocating the current input vector to a cluster corresponding to the identified prototype vector, and altering the identified prototype vector as a function of the current input vector;
when the minimum vector distance exceeds the vigilance value, allocating the current input vector to a new cluster, using the current input vector as a prototype vector for such new cluster, and including the prototype vector for said new cluster within the set of initial prototype vectors.

18. The method of claim 17, in which the method is repeated for subsequent image frames among the set of image frames, and further comprising the step of:
increasing the vigilance value after clustering input vectors of a first image frame among the sequence of image frames prior to clustering input vectors of a subsequent image frame among the sequence of image frames.

19. The method of claim 15, in which the method is repeated for subsequent image frames among the set of image frames, and further comprising the step of:

detecting a scene change among the sequence of image frames.

20. The method of claim 19, in which the step of detecting a scene change comprises the step of:

tracking a clustering change ratio for each image frame among the sequence of image frames.

21. The method of claim 15, in which the method is repeated for subsequent image frames among the set of image frames, and further comprising the step of:

identifying a feature cluster among the plurality of clusters achieved during allocating a current set of input vectors, wherein the feature cluster includes an indicator of presence of an object in the current image frame;

tracking the object through subsequent image frames among the sequence of image frames by monitoring said indicator while the method is repeated for subsequent image frames among the set of image frames.

22. A method for clustering color input vectors of a current set of color input vectors in a sequence of sets of color input vectors, in which the current set of color input vectors corresponds to color values of pixels within a current image frame being processed and the sequence of sets of color input vectors corresponds to color values of pixels within each one image frame of a sequence of image frames, the method comprising the steps of:

identifying a set of prototype vectors for use in allocating the color input vectors of the current set of color input vectors into a plurality of clusters, wherein there is a one to one correspondence between the set of prototype vectors and the plurality of clusters;

allocating the color input vectors of the current set of color input vectors into a plurality of clusters of color input vectors, wherein during the step of allocating the set of prototype vectors changes dynamically resulting in a modified set of prototype vectors after all color input vectors of the current set of color input vectors are allocated among the plurality of clusters, each cluster among the plurality of clusters having a number of allocated input vectors; and after the step of allocating, discarding any prototype vector among the modified set of prototype vectors for which a corresponding cluster among the plurality of clusters has less than a specific number of allocated color input vectors.

23. The method of claim 22, in which the method is repeated for subsequent image frames among the set of image frames, and further comprising the step of:

detecting a scene change among the sequence of image frames;

in response to a scene change detection, processing the current image frame as an initial image frame to reset the set of prototype vectors and reset the corresponding clusters.

24. The method of claim 23, in which the method is repeated for subsequent image frames among the set of image frames, and further comprising the step of:

identifying a feature cluster among the plurality of clusters achieved during allocating a current set of input vectors, wherein the feature cluster includes an indicator of presence of an object in the current image frame;

tracking the object through subsequent image frames among the sequence of image frames by monitoring said indicator while the method is repeated for subsequent image frames among the set of image frames;

in which a first value is used during the initial frame for the vigilance value, and in which the vigilance value is increased after clustering input vectors of the initial image frame during a common scene.

* * * * *